United States Patent
Lalli (10) Patent No.: US 10,610,873 B2
(45) Date of Patent: Apr. 7, 2020

(54) FILTRATION SYSTEM UTILIZING ACTUATED FLOW CONTROL VALVE

(71) Applicant: Jason D Lalli, Washington, PA (US)

(72) Inventor: Jason D Lalli, Washington, PA (US)

(*) Notice: Subject to any disclaimer, the term of this patent is extended or adjusted under 35 U.S.C. 154(b) by 155 days.

(21) Appl. No.: 14/808,891

(22) Filed: Jul. 24, 2015

(65) Prior Publication Data
US 2017/0021368 A1 Jan. 26, 2017

(51) Int. Cl.
| | | |
|---|---|---|
| *B04C 11/00* | (2006.01) | |
| *B01D 37/04* | (2006.01) | |
| *B01D 29/60* | (2006.01) | |
| *B04C 9/00* | (2006.01) | |
| *B01D 29/62* | (2006.01) | |

(52) U.S. Cl.
CPC ............ *B04C 11/00* (2013.01); *B01D 29/603* (2013.01); *B01D 29/606* (2013.01); *B01D 37/043* (2013.01); *B01D 37/046* (2013.01); *B01D 29/62* (2013.01); *B04C 2009/004* (2013.01)

(58) Field of Classification Search
CPC .......... D21D 5/02; D21D 5/023; D21D 5/026; B01D 29/606; B01D 37/046; B01D 29/62; B01D 35/143; B01D 35/157; B01D 37/043; B01D 36/045; B01D 39/603; B01D 39/606; B04C 11/00; B04C 2009/004
USPC .......................................... 210/111, 808, 137
See application file for complete search history.

(56) References Cited

U.S. PATENT DOCUMENTS

| | | | | |
|---|---|---|---|---|
| 4,282,105 | A | * 8/1981 | Crowe | .................. B01D 29/15 210/798 |
| 4,929,363 | A | * 5/1990 | Barzuza | ................ B01D 37/04 210/111 |
| 5,006,248 | A | 4/1991 | Anderson | |
| 5,028,568 | A | 7/1991 | Anderson | |
| 5,035,784 | A | 7/1991 | Anderson | |
| 5,059,346 | A | 10/1991 | Spanbel | |
| 5,096,475 | A | 3/1992 | Anderson | |
| 5,104,539 | A | 4/1992 | Anderson | |

(Continued)

FOREIGN PATENT DOCUMENTS

WO  WO1983001969 A1  6/1983

OTHER PUBLICATIONS

International Searching Authority; International Search Report and Written Opinion of the International Searching Authority; International Application No. PCT/US16/42226; Patent Cooperation Treaty; pp. 1-9; publisher United States International Searching Authority; Published Alexandria, Virginia, US; copyright and mailing date Oct. 4, 2016; copy enclosed (9 pages).

*Primary Examiner* — Terry K Cecil
(74) *Attorney, Agent, or Firm* — Metz Lewis Brodman Must O'Keefe LLC (57) ABSTRACT

A filtration system with a filter out of which filtered medium exits are provided. The system includes a control panel that receives pressure and flow rate information of the medium and uses the pressure information to send a first signal to prevent a pressure differential of the medium from exceeding a first set point yet maintain filtration of the medium. The control panel uses the flow rate information to send a second signal to prevent the flow rate of the medium from exceeding a second set point yet maintain filtration of the medium. An actuated flow control valve is present that opens at different amounts, and the medium flows through the actuated flow control valve.

13 Claims, 5 Drawing Sheets

(56) References Cited

U.S. PATENT DOCUMENTS

| | | |
|---|---|---|
| 5,128,064 A | 7/1992 | Spanbel |
| 5,137,607 A | 8/1992 | Anderson |
| 5,169,576 A | 12/1992 | Anderson |
| 5,187,953 A | 2/1993 | Mount |
| 5,194,200 A | 3/1993 | Anderson |
| 5,208,121 A | 5/1993 | Yahnke |
| 5,208,190 A | 5/1993 | Anderson |
| 5,215,943 A | 6/1993 | Anderson |
| 5,227,342 A | 7/1993 | Anderson |
| 5,268,101 A | 12/1993 | Anderson |
| 5,269,926 A | 12/1993 | Webster |
| 5,308,454 A | 5/1994 | Anderson |
| 5,342,431 A | 8/1994 | Anderson |
| 5,342,709 A | 8/1994 | Yahnke |
| 5,439,624 A | 8/1995 | Anderson |
| 5,484,536 A | 1/1996 | Yamaguchi et al. |
| 5,487,774 A | 1/1996 | Peterson |
| 5,552,351 A | 9/1996 | Anderson |
| 5,610,109 A | 3/1997 | Anderson |
| 5,639,412 A | 6/1997 | Anderson |
| 5,712,037 A | 1/1998 | Anderson |
| 5,963,417 A | 10/1999 | Anderson |
| 6,251,294 B1 * | 6/2001 | Davis .................. B01D 29/114 210/106 |
| 6,285,816 B1 | 9/2001 | Anderson |
| 7,540,995 B2 | 6/2009 | Hatch |
| 7,632,416 B2 | 12/2009 | Levitt |
| 7,896,169 B2 | 3/2011 | Levitt |
| 8,116,067 B2 | 2/2012 | Anderson |
| 8,216,445 B2 | 7/2012 | Anderson |
| 2003/0095894 A1 | 5/2003 | Umezawa et al. |
| 2004/0191633 A1 | 9/2004 | Johnson |
| 2007/0039900 A1 | 2/2007 | Levitt |
| 2007/0045168 A1 | 3/2007 | Levitt |
| 2007/0102359 A1 | 5/2007 | Lombardi et al. |
| 2009/0050572 A1 | 2/2009 | McGuire et al. |
| 2009/0314711 A1 | 12/2009 | Barry |
| 2010/0015429 A1 | 1/2010 | Anderson |
| 2010/0237013 A1 | 9/2010 | Burke et al. |
| 2011/0120959 A1 | 5/2011 | Levitt |
| 2011/0180423 A1 | 7/2011 | Barry |
| 2011/0257788 A1 | 10/2011 | Wiemers et al. |
| 2012/0145609 A1 * | 6/2012 | Caffell ..................... B04C 5/22 210/137 |
| 2013/0248450 A1 | 9/2013 | Kenley et al. |
| 2014/0048470 A1 | 2/2014 | Lalli |

\* cited by examiner

FILTRATION SYSTEM UTILIZING ACTUATED FLOW CONTROL VALVE

FIELD OF THE INVENTION

The present invention relates generally to a filtration system that utilizes an actuated flow control valve, as a means of controlling performance of filtration of the system, for filtering a liquid. More particularly, the present application involves a filtration system that utilizes a pair of set points, one being flow rate and the other pressure differential, to achieve a high capacity filtration rate with minimum filtration system fouling.

BACKGROUND

Industries such as food and beverage, oil and gas, pulp and paper, and waste water treatment utilize filtration technology. The filtration removes solids from the medium in which the particulates are carried. The filtration process may be accomplished with a single process and filter, or multiple different types of filtration using different filtration equipment can be used with the medium in order to achieve a desired removal of particulates. One such filtration system utilizes a spinning filter, sometimes called a hydroclone, that receives feedwater with particulates therein. A spinning flow pattern is developed within the hydroclone so that heavier solids within the feedwater are moved by centrifugal force to the inside wall of the hydroclone for removal, or down into a circulation loop for removal at another time.

In a self-cleaning hydroclone filter system, medium and lighter particulates engage a self-propelled cleaning unit that spins around a filter media or screen that filters out these particulates from the feedwater. Filtered water is then removed from the hydroclone and is moved downstream to a storage tank, subsequent filtration station, or anywhere else desired. The spinning filter unit can have one or more brushes that continuously wipe off the filter media as they spin around the filter media to clean it and help prevent it from being clogged or fouled. The particulates removed by this cross-flow portion of the hydroclone are likewise moved down into the circulation loop via the flow path established within the hydroclone, or disposed of from the system.

Although capable of filtering particulates from feedwater, such filters ultimately become clogged in that particles impinge themselves within the filter media thus reducing the system's filtering capacity. The flow within the filter may push particulates against the filter media causing them to become stuck within gaps of the filter media, and unable to be swept off by the spinning brush. Over time, the system must be shut off and the filter media removed and serviced in which the fouled filter media is cleaned.

In order to reduce fouling of the filter screen and downtime of the filter system, certain techniques have been established for running the filtration process. One such process utilizes the pressure differential within the hydroclone between the area inside the filter media and the area outside of the filter media. If this pressure differential is great, solids will be pushed into the filter media and cause clogging or fouling of the filter media. A pressure differential set point may be established that is a safe pressure differential under which clogging or fouling will be minimized. A filtrate flow control valve set at a particular flow control rate is present at the exit of the filtered medium exiting the hydroclone. Once the pressure differential set point is reached, an automated valve on the effluent line is closed and a drain valve of the hydroclone is opened to cause particulates to exit the filtration system.

Although capable of removing particulates from the hydroclone before fouling of the filter media occurs, such a process must have the pressure differential set point at a level that is lower than a point at which fouling of the filter media occurs. This is because the system cannot react instantaneously to spikes in the pressure differential which would cause fouling to occur if the set point were located at or close to the pressure differential at which fouling actually occurs. The set point is thus located at a lower level to give the system time to reduce pressure through various means including closing the effluent valve once it appears the pressure differential is rising. This process sacrifices filtration capacity to achieve a reduction in filter media fouling and thus much less medium is filtered by the system per unit time. Further, although described as avoiding filter media fouling, it is to be understood that over time the filter media will in fact become fouled with particulates and will need to be serviced. The aforementioned process helps to reduce the amount of downtime in the system, but does not eliminate the occurrences of filter screen fouling. As such, there remains room for variation and improvement within the art.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-450, 170-190, and 153-462. Further, all limits mentioned herein include all other limits included in the mentioned limits. For instance, a limit of up to 7 also includes a limit of up to 5, up to 3, and up to 4.5.

The present invention provides for a filtration system 10 that may be used to separate substances from one another. For example, the filtration system 10 may be used to separate water from contaminants in a fluid that may be hydraulic fracturing flow back fluid. However, the filtration system 10 may be used in a variety of applications as a way to remove particulates from a medium. The system 10 employs an actuated flow control valve 12 that can open and close automatically in order to regulate a pressure differential present in a filter 14 of the system 10. The filtration system 10 may be arranged to regulate the pressure differential so that it does not exceed a particular set point. Still further, the filtration system 10 may also include a second set point that is the flow rate of the medium through the filter 14. The filtration system 10 may be set up so that both of these two set points are not exceeded. The actuated flow control valve 12 may allow the filtration system 10 to operate so that capacity of the filtration system 10 is increased resulting in a larger amount of filtered medium 34 to be produced and to minimize fouling of the filter media 18 that occurs through the impingement of particulates onto the filter media 18 within the filter 14.

Figure 1:
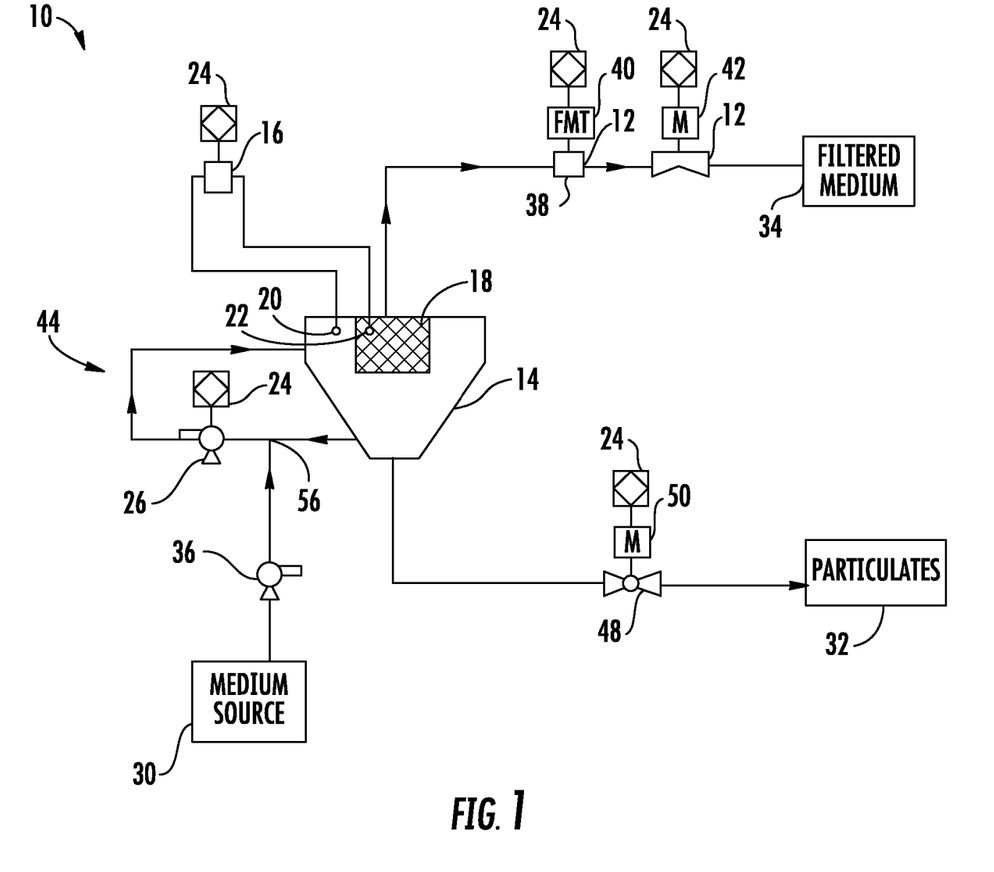
FIG. 1 is a schematic view of a filtration system utilizing an actuated flow control valve in accordance with one exemplary embodiment.

FIG. 1 is a schematic view of a filtration system 10 in accordance with one exemplary embodiment of the present invention. Medium that is to be filtered is provided to the system 10 by a medium source 30. The medium can be water, oil, or any other type of fluid into which particulates that are desired to be removed are contained. The medium source 30 can be under pressure so that the medium will tend to flow into the downstream components of the filtration system 10. The medium source 30 may be in a tank that imparts some amount of pressure head to the medium to cause it to want to move downstream. In other arrangements, the medium source 30 is an outlet of some other filtration process in an overall filtration scheme into which the filtration system 10 is a component. Additionally or alternatively, an influent pump 36 can be provided with the medium source 30 to pull the medium from the medium source 30 and to push it to the downstream locations. The influent pump 36 may be used instead of an elevated tank, or may be used in combination with an elevated tank that holds the medium source 30. Although not show in FIG. 1, the influent pump 36 can be in communication with a control panel 24 that can obtain flow information from the influent pump 36 and that may control the action of the influent pump 36. Although a single medium source 30 is shown, it is to be understood that multiple sources of medium may be present in other versions of the filtration system 10. The influent pump 36 can be any type of pump such as a variable frequency drive pump. As discussed, the influent pump 36 need not be present in other embodiments. Instead, the medium source 30 may be under pressure from another mechanism such as being in a water tower. Any type of pressure source may be used in other embodiments to cause the medium source 30 to be under pressure in the system 10.

The filtration system 10 includes a circulation loop 44 into which the medium from the medium source 30 is inserted. The circulation loop 44 has a circulation pump 26 that drives fluid through the circulation loop 44. The circulation pump 26 is in communication with the control panel 24 that obtains data from the circulation pump 26 and that in turn can control the operation of the circulation pump 26. Medium from the medium source 30 is inserted into the circulation loop 44 at a location 56 just before the circulation pump 26. Medium exiting the filter 14 merges with the medium supplied by the medium source 30 at location 56 and this combined stream is then subsequently supplied to the circulation pump 26. Inserting the medium from the medium source 30 at location 56 upstream of the circulation pump 26 may eliminate the arrangement in which medium is forced into the filtration system 10 by a pump.

Medium exiting the circulation pump 26 is introduced back into the filter 14 and medium within the filter 14 is subsequently pulled from the filter 14 back to location 56. The circulation loop 44 is thus driven by the circulation pump 26 and includes medium that has particulates within. These particulates are however kept out of the medium that is filtered by the filter 14 and that makes up the filtered medium 34. The particulates are in effect trapped within the circulation loop 44 as the filtration system 10 operates. The circulation loop 44 functions to clean the filter media 18 and to circulate suspended particulates in the medium.

The filter 14 is a component of the filtration system 10 that functions to remove particulates within the medium that is introduced into the filter 14. The filter 14 may be constructed in a variety of manners in accordance with different exemplary embodiments of the filtration system 10. In accordance with certain exemplary embodiments, the filter 14 is a TEQUATIC™ PLUS filter provided by The Dow Chemical Company having offices located at 2030 Dow Center, Midland, Mich., 48674, USA. This type of filter is sometimes referred to as a hydroclone filter. However, it is to be understood that the use of a hydroclone filter is only exemplary, and that other types of filters may be used as the filter 14. Further, although described as having a single filter 14, multiple numbers of filters 14 could be used in other exemplary embodiments. Medium entering the filter 14 via the circulation loop 44 is forced against a self-propelled filter unit and spins the self-propelled filter unit via the force of the medium flow. The self-propelled filter unit has one or more brushes that likewise spin. The brushes are arranged around filter media 18 of the filter 14 and function to clean the surfaces of the filter media 18 as they spin around the filter media 18. This brushing action sweeps off particulates that would otherwise accumulate on the filter media 18 and impede flow through the filter media and reduce filtering capacity.

A vortex flow pattern is established within the filter 14 and heavier solids within the medium being filtered are pushed outwards by centrifugal forces and tend to fall downwards within the filter by gravity. Lighter solids are generally removed by the cross-flow filtration as previously indicated and go either into the circulation loop 44 or can join the heavier solids towards the bottom of the filter 14. Particulates 32 made up of the heavier solids, and that may also include the lighter solids, flow out of the bottom of the filter 14 and past an outlet valve 48. In the embodiment illustrated, the outlet valve 48 is a ball valve 48 that is actuated by a motor 50. These components are in communication with the control panel 24. The filtration system 10 may open the ball valve 48 that in turn causes the particulates 32 to flow out of the filter 14, through the ball valve 48, and then into a collection chamber, another filtration sub-system, or anywhere else desired. The particulates 32 are sometimes referred to as concentrate 32 and represent medium into which a larger amount of particulates are present than the medium that is known as effluent 34 or filtered medium 34 that contains fewer or no particulates therein.

The filtration system 10 also includes a pressure differential sensor 16 that measures the pressure difference between two locations 20, 22 associated with the filter 14.

Location 20 is a point within the filter 14 located outside of the filter media 18 such that the medium at location 20 is not filtered. Location 22 is a point inside the filter media 18 and is the pressure of medium that has been filtered by the filter media 18. Within the filter 14, medium is forced through the filter media 18 and then subsequently out of the filter 14 to the filtered medium 34. In order to move medium through the filter media 18 and out of the filter 14, there must be a pressure differential between locations 22 and 20 so that pressure is higher at location 20 than at location 22 to in turn cause the medium to flow through the filter media 18 and out of the filter 14.

The pressure differential sensor 16 may sense the pressure at locations 20 and 22 and can convert these readings to a pressure differential, or can submit this information to the control panel 24 that in turn receives data from the pressure differential sensor 16 and does the conversion to arrive at a pressure differential. Regardless of what component performs the calculation, the filtration system 10 will be provided with a pressure differential within the filter 14 that can be used in a control process of the filtration system 10. Although described as acquiring a pressure differential within the filter 14 for control of the filtration system 10, it is to be understood that the pressure differential sensor 16 can be arranged to measure the pressure differential at other portions in the system to achieve control in other exemplary embodiments. For example, the pressure differential sensor 16 may measure pressure differences in the circulation loop 44, the filtered medium 34 exit line out of the filter 14, or between the location 56 and the medium source 30 in other embodiments.

The filtration system 10 may also include a flow meter 38 that measures flow rate of the filtered medium 34 exiting the filter 14. A flow meter transmitter 40 can be incorporated into the flow meter 38 or otherwise associated with the flow meter 38 in order to relay flow rate information of the filtered medium 34 to the control panel 24.

An actuated flow control valve 12 may be located downstream of the flow meter 38 such that the flow meter 38 is located between the filtered medium 34 exit of the filter 14 and the actuated flow control valve 12. The flow control valve 12 may include a motor 42 that functions to open and close the flow control valve 12. Information from the actuated flow control valve 12 and motor 42 can be sent to the control panel 24, and the control panel 24 can be used to automatically control the functioning of the motor 42 and the actuated flow control valve 12. The actuated flow control valve 12 can be opened and closed through a range of degrees so that a desired flow capacity can be established through the actuated flow control valve 12. In effect, the actuated flow control valve 12 is not an open/closed only valve, but can be opened through a range of degrees so that it is fully closed, minimally opened, opened halfway, opened almost all the way, fully opened, etc. The actuated flow control valve 12 can be opened 10%, 20%, 30%, 60%, 80%, or up to 100% in accordance with various exemplary embodiments. Although any type of actuated flow control valve can be used, the filtration system 10 may include an actuated flow control valve 12 that may be a HAYWARD® actuated flow control valve model number EPM3-120 sold by Hayward Industries whose offices are located at 620 Division Street, Elizabeth, N.J., 07201, USA.

Filtered medium 34 flowing past the actuated flow control valve 12 may be moved into a storage container, to a subsequent downstream filtering subsystem, or may be used as a clean source of fluid if the filtration system 10 is the only or is the final stage of a filtering process. The filtered medium 34 is sometimes referred to as effluent and may contain some particulates although not as much as before being introduced into the circulation loop 44. In some embodiments of the filtration system 10, there is no open only/closed only valve located in the line between the outlet of the filter 14 for the filtered medium 34 and the exit of the filtered medium 34 from the filtration system 10.

The control panel 24 may have user input and output mechanisms, displays, and ports. The control panel 24 may include a microprocessor or other computer that can be programmed to control the operation of the filtration system 10. Although shown in communication with various components, it is to be understood that the control panel 24 may be in communication with any or all of the components of the filtration system 10 in accordance with other exemplary embodiments. The filtration system 10 can be controlled automatically by the control panel 24, or user input may be received so that the filtration system 10 is manually controlled.

The actuated flow control valve 12 can be initially closed when the system 10 is at rest. This closure will prevent filtered medium 34 from exiting the system 10 and will in effect prevent filtration of the medium 34 in the filter 14. At start up, the circulation pump 26 can be started and medium will assume circulation flow through the circulation loop 44 when the system 10 is pressurized. The ball valve 48 may be closed to prevent particulates 32 from leaving the filter 14 and the system 10 because there is no filtration being done at start up. The control panel 24 may include an automatic program that slowly opens the actuated flow control valve 12 from a closed position to an open position. The opening may be done in a slow manner to ensure that strain is not imparted onto the components of the filtration system 10. A controlled opening of the actuated flow control valve 12 will in turn cause medium to flow from the medium source 30 because the only place the medium from the medium source 30 can go into the system 10 is via replacement of filtered medium 34 that is sent out of the system 10.

Figure 2:
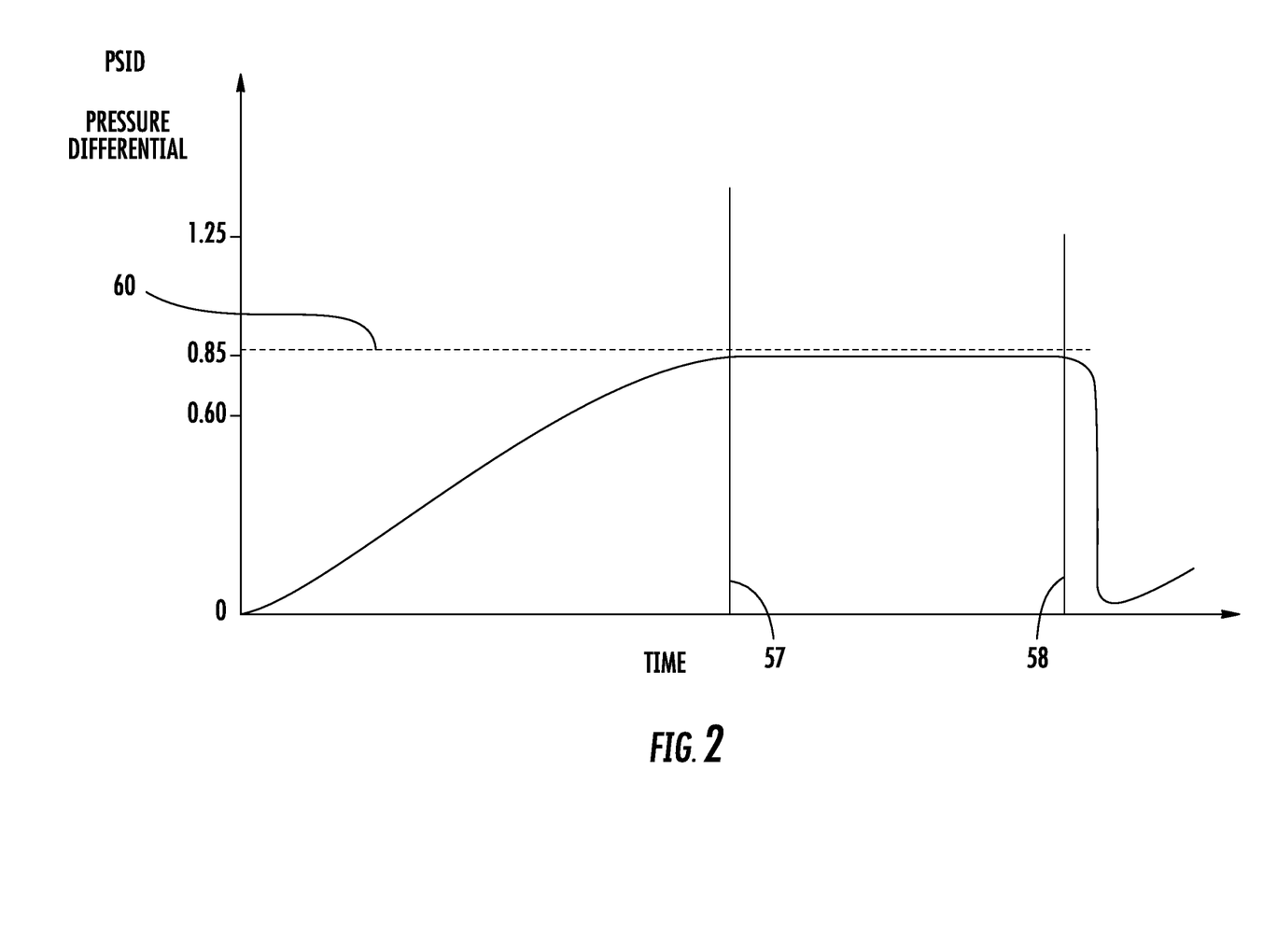
FIG. 2 is a graph of operation of the filtration system showing time versus pressure differential.

After start up, medium from the medium source 30 will enter the circulation loop 44 at location 56 and medium will be filtered by the filter 14 and filtered medium 34 will exit the system 10 through the actuated flow control valve 12. FIG. 2 illustrates the system 10 after start up in which the actuated flow control valve 12 continues to open to allow greater filtering capacity through the system 10, and in turn the measured pressured differential between locations 20 and 22 as returned by the pressure differential sensor 16 increases. This increase in pressure differential signifies that greater flow is moving through the filter media 18 because as the difference in pressure between locations 20 and 22 increases, greater flow is achieved between these points. The filtration system 10 is set up so that a first set point 60 is established at a selected pressure differential. As an example, the first set point 60 is set at a pressure differential of 0.85 as shown on the graph in FIG. 2. The filtration system 10 will continue to increase flow of the medium by continuing to open the actuated flow control valve 12 until the pressure differential reaches the first set point 60. At this point in time, the filtration system 10 will stop opening of the actuated flow control valve 12 to maintain the pressure differential at the first set point 60. This occurs at time 57 on the graph in FIG. 2.

The first set point 60 is selected so that particulates will not be likely to impinge upon and foul the filter media 18, which can include a filter screen. The velocity of flow of the medium onto the filter media 18 will be limited at this pressure differential so that particulates do not jamb into and otherwise clog the filter media 18, but yet sufficient velocity is present to allow a significant amount of flow through the filter media 18 so that the filtration system 10 has a large capacity of filtration. At point in time 57 the system 10 will continue to monitor the pressure differential and will make automatic adjustments of the actuated flow control valve 12 to open it a bit, or close it a bit, as is needed in order to maintain the pressure differential at the first set point 60 of 0.85. When maintaining the first set point 60, the filtration of the medium may still occur and a purge of the filter 14 may not occur when maintaining the first set point 60.

After filtering for a certain amount of time, the filtration system 10 may enter a purge stage in which the particulates that have built up within the filter 14 and that are pushed through the circulation loop 44 are removed. This purge is done for preventative maintenance in the system 10 to clear particulates from the filter 14. At time 58 the actuated flow control valve 12 may be closed and the ball valve 48 can be opened. This will cause a dumping of particulates out of the filter 14 and through the ball valve 48 to the particulates 32 tank or other location. As shown in FIG. 2, at this time 58 the pressure differential will decrease down to zero as the actuated flow control valve 12 is closed and the system 10 is purged. Once the purge occurs, the actuated flow control valve 12 may again be slowly opened and the filtered medium 34 will again be produced. This pattern may subsequently repeat. The amount of time selected between the times 57 and 58 can be set at any desired amount, or there may be sensors or other mechanisms present to determine when the particulates have built up to a point that purging of the system 10 is desirable.

The plot shown in FIG. 2 of the pressure differential over the course of time can be generated through obtaining an average of pressure differential readings over small time periods so that a smooth curve is obtained. In this regard, it may be the case that the pressure differential in fact exceeds the first set point 60 for a particular reading, or readings, but due to the magnitude of it in view of the number or magnitude of other readings the overall average may remain below the first set point 60. In other arrangements, the plot is not averaged or smoothed, but is instead the actual measurement of the pressure differential. As such, it is to be understood that the plot shown in FIG. 2 of the pressure differential over the course of time can be obtained through an averaging process of different measurements, or may be the actual measurements of the pressure differential and thus unsmoothed. Further, is to be understood that the other plots of pressure differential or flow rate as described herein by be obtained in the same manners—averaged or actual.

Figure 3:
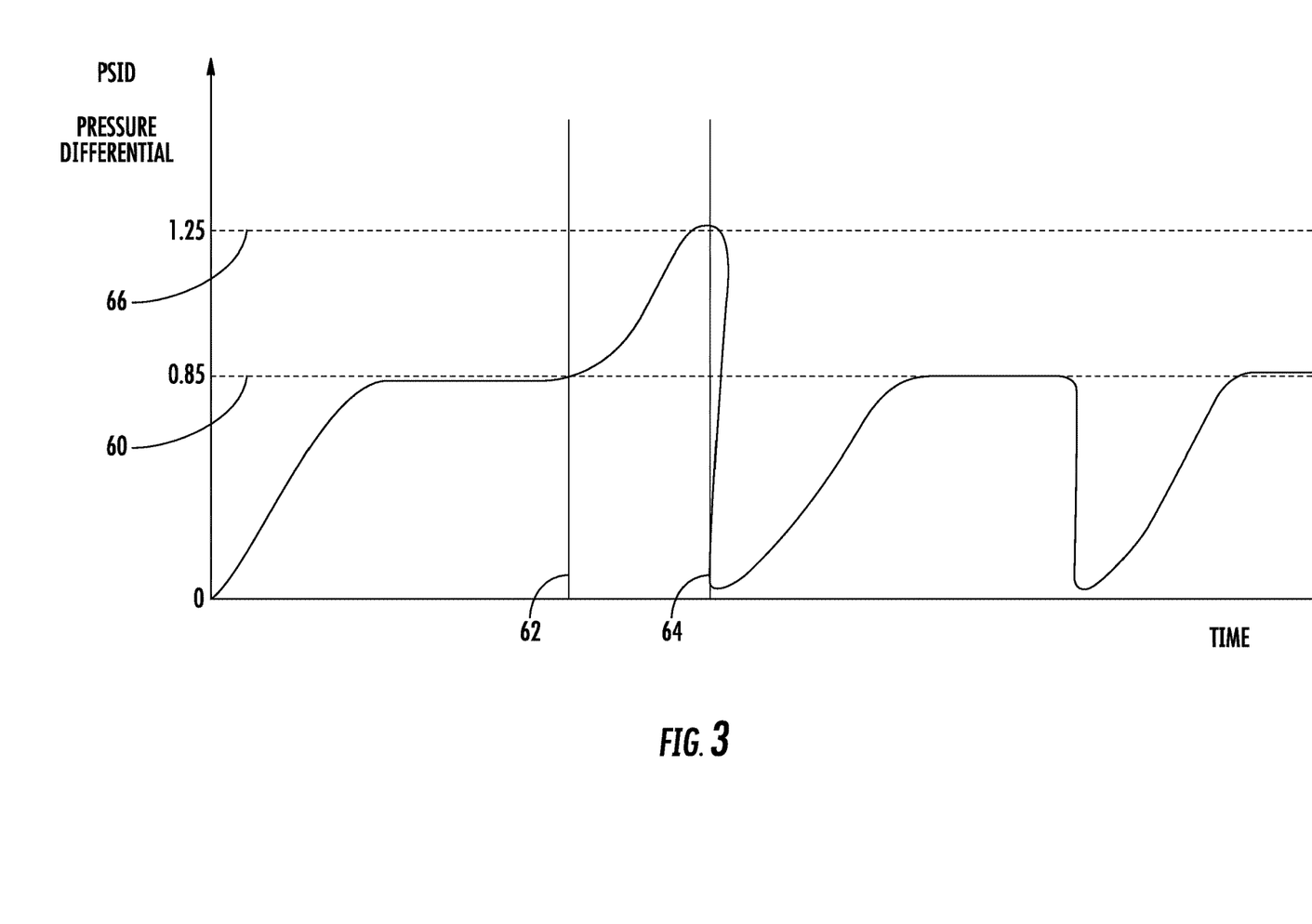
FIG. 3 is a graph of operation of the filtration system showing time versus pressure differential in accordance with another mode of operation.

The filtration system 10 may include a safety shut off mechanism as can be illustrated with reference to FIG. 3. The safety shut off mechanism may be set at a particular pressure differential. For example, as shown in FIG. 3, the safety shut off pressure differential 66 is set at a pressure differential of 1.25. The first set point 60 is again set at a pressure differential of 0.85. It is to be understood that the shut off pressure differential 66 can be of any value in accordance with other exemplary embodiments. The shut off pressure differential 66 is at a higher level than the first set point 60 and is present in order to stop the filtration system 10 if problems occur that may damage the filtration system 10 or cause fouling of the filter media 18.

After start up, the filtration system 10 operates as previously described in that the actuated flow control valve 12 opens and closes to maintain the pressure differential at the first set point of 0.85. If the medium source 30 begins providing medium that has large particulates or large amounts of particulates, the filter 14 may become clogged with these larger amounts of particulates thus reducing flow through the filter media 18 and subsequently reducing the amount of filtered medium 34 produced. The actuated flow control valve 12 may not be capable of regulating the pressure differential at this point in time which is designated as time 62. The pressure differential may begin to rise past the first set point 60 to the safety shut off pressure differential 66 that is shown at time 64. In some embodiments, once the safety shut off pressure differential 66 is reached, the filtration system 10 shuts down all operation in order to prevent damage to the system 10 or to prevent fouling of the filter media 18. In this regard, the actuated flow control valve 12 may be closed or the motor 42 stopped, the circulation pump 26 may be stopped, and/or the optional influent pump 36 may be stopped. In some embodiments, the filtration system 10 may monitor the pressure differential to determine if the safety shut off pressure differential 66 is reached for a specific amount of time, such as 0.3 seconds. Stopping of the system 10 may be implemented once the safety shut off pressure differential 66 has been reached for this particular amount of time.

Stopping of the system 10 is shown at time 64 in which the pressure differential drops back to zero. The filtration system 10 may then again be started and run to the first set point 60 until a purge of particulates 32 is desired. Again, this purge may simply be preventative maintenance. In some arrangements of the filtration system 10, when the system 10 shuts down due to the safety shut off pressure differential 66 being reached the ball valve 48 opens and the particulates 32 are removed from the filter 14 while the pumps 26 and 36 are stopped and when the actuated flow control valve 12 is stopped.

Although described as going over the first set point 60 at time 62 and reaching the safety shut off pressure differential 66 at time 64, it may be the case that the filtration system 10 functions to reduce the pressure differential before reaching the safety shut off pressure differential 66 and stopping. In this regard, once the pressure differential moves into the area between the first set point 60 and the safety shut off pressure differential 66, the actuated flow control valve 12 can close to cause the pressure differential to drop down to the first set point 60. If the first set point 60 is maintained, then the filtration system 10 may continue to function without having to be stopped even though the pressure differential moved above the first set point 60. As such, the first set point 60 may be at a pressure differential that is desired to be maintained, but the system does not stop if the pressure differential exceeds the first set point 60.

There may be a minimum set point established in certain embodiments. This may come into play at times in which the first set point 60 is exceeded, but the safety shut off pressure differential 66 is not reached or not reached for the sufficient amount of time as discussed. As the actuated flow control valve 12 closes to bring the pressure differential down to the level of the first set point 60, the flow rate may be significantly decreased due to this adjustment. If the flow rate reaches the minimum set point (for example 20 gpm), or reaches the minimum set point for a set amount of time, the system 10 will then conduct a purge in which the actuated flow control valve 12 closes and particulates 32 are flushed from the filter 14 through the outlet valve 48. The system 10 will not stop once the minimum set point is reached, but instead the purge will occur.

In other embodiments the filtration system 10 may have both the first set point 60 and a second set point 74. The filtration system 10 may operate so that after start up, the filtration system 10 encounters either the first set point 60 or the second set point 74. Once one of the set points 60 or 74 is encountered, the filtration system 10 maintains the functioning of the filtration so that the first encountered set point 60 or 74 is maintained. The first set point 60 may be a pressure differential as measured by the pressure differential sensor 16 and as previously discussed. The second set point 74 may be a flow rate of the filtered medium 34 as measured by the flow meter 38 which represents the amount of filtered medium 34 that is flowing out of the filter 14. This second set point 74 may be 40 gpm, 60, gpm, 70 gpm, 80 gpm, or up to 200 gpm in accordance with various exemplary embodiments. It is to be understood that the actual flow rates immediately called out are only exemplary and that the second set point 74 could be any flow rate in accordance with various exemplary embodiments. The system 10 may be operated so that filtration of the medium still occurs when the second set point 74 is maintained and so that a purge of the filter 14 does not occur when the second set point 74 is exceeded or maintained.

When the system 10 has both the first and second set points 60 and 74, it may also have the minimum set point so that if the minimum set point is reached or if the flow rate goes below the minimum set point a purge occurs. The system 10 may not shut down if the minimum set point is reached. The minimum set point may be a flow rate that is lower than the flow rate of the second set point 74.

Figure 4:
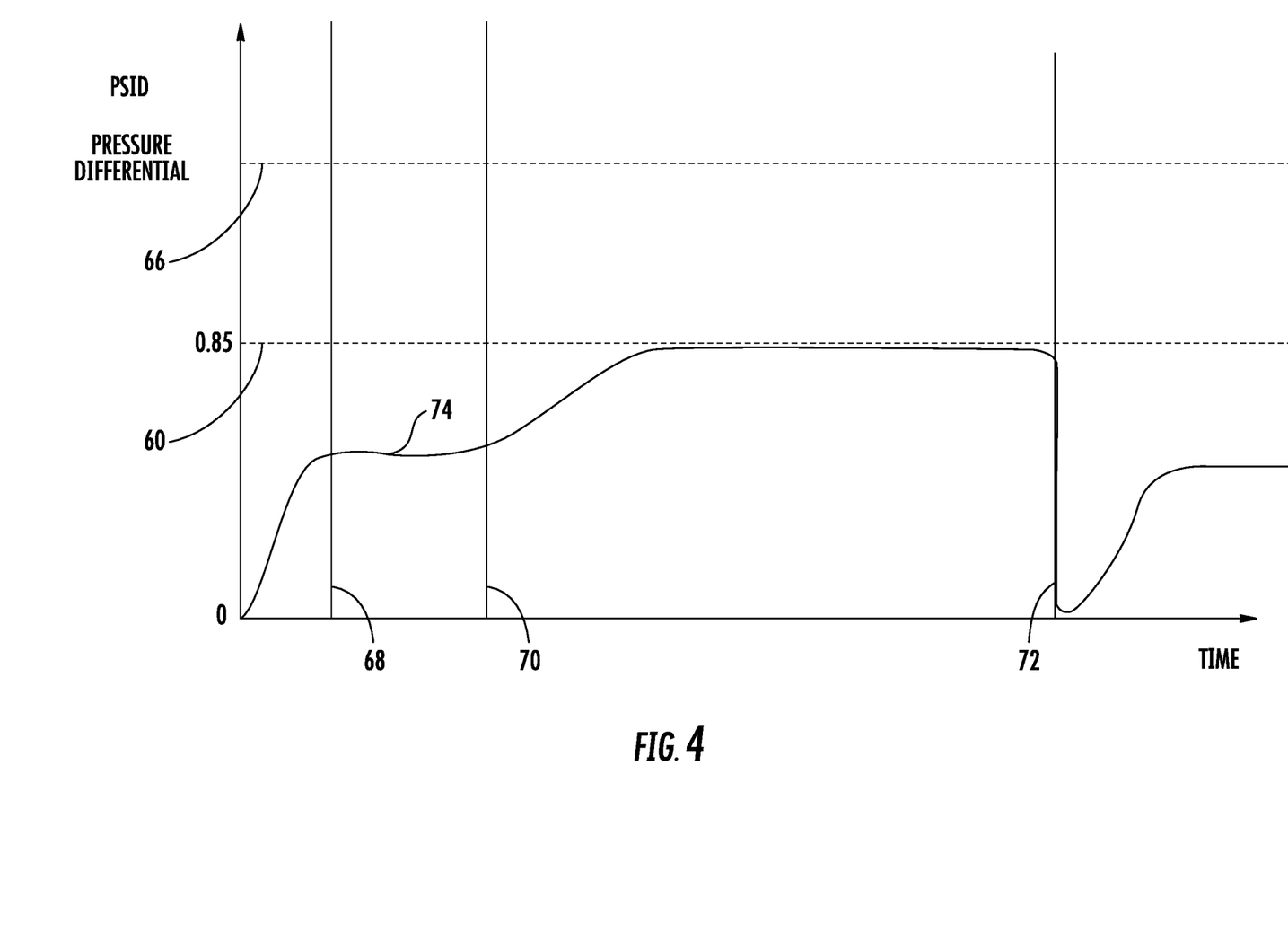
FIG. 4 is a graph of operation of the filtration system showing time versus pressure differential in accordance with yet another mode of operation.

The opening and closing of the actuated flow control valve 12 may be used to regulate the filtration system 10 so that the filtration system 10 operates at either the first set point 60 or the second set point 74. With reference to FIG. 4, at start up the actuated flow control valve 12 opens slowly so that flow occurs through the system 10. The first set point 60 may be set at a pressure differential of 0.85, and the second set point 74 may be set at a flow rate of 80 gpm. As medium flow increases, the pressure within the filtration system 10 will increase. As the actuated flow control valve 12 continues to open and flow of filtered medium 34 increases, the flow meter 38 may sense a flow rate of 80 gpm at time 68. At this point, the second set point 74 has been reached, but the first set point 60 has not been reached because the pressure differential at time 68 is below the level of 0.85. The filtration system 10 will maintain operation so that the flow rate does not exceed the second set point 74 of 80 gpm. This number may be maintained by the position of the actuated flow control valve 12 as it may stop opening at time 68 and maintain the amount of open position. As the system 10 continues to operate, the actuated flow control valve 12 may open or close as needed in order to maintain the flow rate at the second set point 74. This operation at the second set point 74 is maintained from time 68 to time 70 in FIG. 4.

At time 70 the pressure differential in the system 10 begins to rise so that it reaches the first set point 60 of 085. The actuated flow control valve 12 will then make adjustments in order to maintain the pressure differential at the first set point 60 of 0.85, and to maintain the flow rate at the second set point 74 of 80 gpm. In some cases, at time 70 the flow rate may drop below 80 gpm at which time the actuated flow control valve 12 will continue to open until reaching the first set point 60 of 0.85. The system 10 will then maintain the pressure differential at the first set point 60 of 0.85, and the flow rate may be less than 80 gpm so that the second set point 74 is not reached when the system 10 is running between times 70 and 72. As such, the system 10 may be set up so that it runs at the first set point 60 for some amount of time but the second set point 74 is not reached, and may be set up to run for a length of time in which the second set point 74 is reached but not the first set point 60.

After a specific amount of time running at the first set point 60, the system at time 72 may conduct a purge of the particulates 32 as previously discussed. The flow rate and pressure differential will drop to zero at time 72, and then subsequently the system 10 may be restarted to again filter the medium. The system 10 may at start-up be arranged to slowly open the actuated flow control valve 12 from a fully closed position until the system 10 reaches either the first set point 60 or the second set point 74, whichever one comes first. The opening of the actuated flow control valve 12 may stop at that point and then may close, open, or remain at the same place in order to maintain the system 10 at the first encountered set point 60 or 74. The actuated flow control valve 12 may thus control the pressure differential in the system 10 and the flow rate in the system 10. The actuated flow control valve 12 can be automatically controlled by the microprocessor or computer contained with the control panel 24. The actuated flow control valve 12 may in some embodiments be provided so that it is not manually adjustable. Further, the actuated flow control valve 12 may be provided so that it is not an open or closed only valve, but one that is capable of being open, closed, and various degrees in between so that it can be partially opened and partially closed.

The filtration system 10 may be set up so that a minimum flow rate can be established. The flow rate can be measured by the flow meter 38, and the pressure differential measured between locations 20 and 22 can be monitored and adjusted via the operation of the actuated flow control valve 12. If the flow as measured by the flow meter 38 is reduced to or below a minimum, predetermined rate, then the system 10 will initiate a purge function to remove collected solids from the circulation loop 44 as previously discussed. The minimum, predetermined rate may be less than the second set point 74.

The filtration system 10 can be provided as a skid mounted system in which the various components 14, 16, 38, 12, 44 and 48 are mounted onto a skid or other frame. The medium source 30, the filtered medium outlet 34, and the particulates 32 may not be located on the skid or frame, but may be hooked up to lines on the skid or frame in order to supply and remove fluids and particulates to and from the filtration system 10 that is on the skid or frame. Another arrangement of the filtration system 10 is shown with reference to FIG. 5. Various components and their relationships to one another may be the same as that previously discussed, and a repeat of this information is not necessary. The circulation loop 44 includes a flow control valve 46 that is positioned between the outlet of circulation medium from the filter 14 and location 56. The flow control valve 46 can be adjusted to cause a restriction of the circulation loop 44 to limit circulation. If closed, flow will go from the influent 30 through the circulation pump 26 and into the filter 14. The flow control valve 46 may be manually controlled, or may be automatically controlled and attached to the and in communication with the control panel 24 in accordance with various exemplary embodiments in order to balance the flow through the filter media 18 or into the circulation loop 44. In lieu of a flow control valve 46, other items such as a permanent flow restrictor plate may be permanently employed in a similar fashion to adjust and restrict flow in the circulation loop 44.

Figure 5:
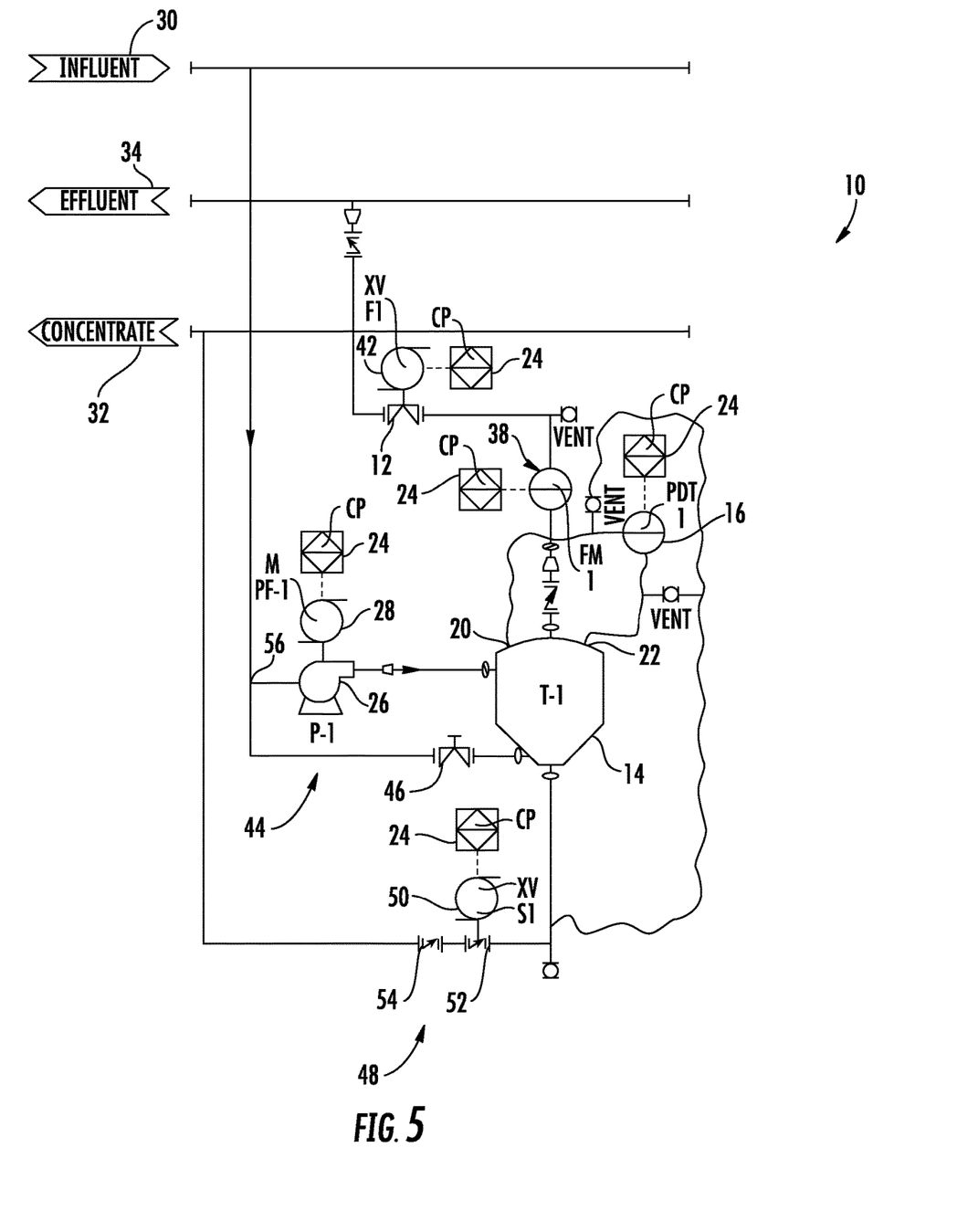
FIG. 5 is a schematic view of a filtration system utilizing an actuated flow control valve in accordance with yet another exemplary embodiment.

As shown in FIG. 5, the circulation pump motor 28 is in communication with the control panel 24 so that the control panel 24 can provide instructions to the circulation pump motor 28 and receive information from the circulation pump motor 28. The circulation pump motor 28 may drive the circulation pump 26. Additional check valves and vents are disclosed in the FIG. 5 embodiment of the filtration system 10 at different locations and in communication with various components.

The flow meter 38 is shown in communication with the control panel 24, and a flow meter transmitter 40 is absent. The flow meter 38 may include the flow meter transmitter 40, or the flow meter transmitter 40 could be a separate component in other exemplary embodiments that functions to transmit flow data from the flow meter 38 to the control panel 24. The arrangement of the concentrate 32 line leaving the filter 14 is somewhat different in the FIG. 5 embodiment. The outlet valve 48 is made of a pair of butterfly valves 52 and 54, and the ball valve 48 previously described in prior embodiments is not in the line. The butterfly valves 52 and 54 may be opened or closed, or may be partially opened or closed so that the butterfly valves have a greater degree of freedom than just simply open or closed. The butterfly valve 52 is controlled by the motor 50 which is in turn in communication with the control panel 24 to provide instructions to and to obtain information from the motor 50. The butterfly valve 52 can be opened when the filtration system 10 purges the concentrates 32 from the filter 14, and can be closed when the concentrates 32 are not desired to be removed. The second butterfly valve 54 can be used in combination with the first butterfly valve 52, or may be present as simply a back-up in case of failure of the first butterfly valve 54. The second butterfly valve 54 may be manually actuated, or can be controlled by the motor 50 and control panel 24 in various embodiments.

The arrangements and components disclosed in the embodiment of the filtration system 10 shown in FIG. 5 can be substituted with the components and arrangements shown and described in other embodiments herein of the filtration system 10.

As such, the system 10 may be run so that the first and second set points 60 and 74 are maintained in that they are not exceeded or met. This maintaining is made by the automatic adjustment of the actuated flow control valve 12 by the control panel 24 upon obtaining data on the system 10. This maintaining may occur while filtration of the medium takes place such that filtered medium 34 is still being produced while the maintaining of the first and second set points 60 and 74 takes place. This maintaining may be arranged so that a purge of the system 10 does not take place, but rather filtering of the medium occurs while the first and second set points 60, 74 are maintained. The system 10 will in effect monitor both the first and second set points 60 and 74 and make automatic adjustments (that is no human being has to open or close a valve or otherwise adjust a valve) so that the set points 60, 74 are not exceeded.

The control panel 24 may be a computer, a microprocessor, or a combination of various components that function to obtain data from the system 10 and process this data and in turn instruct various components of the system 10 to start up, shut down, or modify their operational state. The control panel 24 can send a first signal to a component of the system 10, for example the actuated flow control valve 12, to cause the component to adjust its operation in order to maintain the first set point 60 from being exceeded. The control panel 24 can send a second signal to a component of the system 10, for example the actuated flow control valve 12, to cause the component to adjust its operation to maintain the second set point 74 from being exceeded.

It is to be understood that certain equipment as described herein, such as the ball valve 48, may include or be substituted for other types of valves that can serve a similar purpose. The ball valve 48 may be substituted for, or may include, a butterfly valve, a gate valve, or any other type of valve capable of allowing and preventing flow therethrough. Also, the other valves described herein, such as the butterfly valves 52 and 54 may include or be substituted with other valves that can perform similar functions such as a ball valve or gate valve. Similarly, the pressure differential sensor 16 can refer to a single unit designed to sense pressure between two points and return a value, or to two individual pressure sensing units that can return their values to a different piece of equipment such as a programmable logic controller where the difference in pressure between the two units is calculated.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed:

1. A filtration system having a fluid flow pathway through a cross-flow filter, comprising:
a medium source providing fluid medium for filtration having particulates suspended in said fluid;
said cross-flow filter having filter media configured to restrict flow of said particulates and permit flow of said fluid therethrough, said filter media having a fouling point at which said filter media becomes clogged, said cross-flow filter having an inflow receiving said fluid medium, a first outflow of fluid medium, and a second outflow of filtered medium absent said particulates;
a controller configured with: (i) a preselected pressure differential set point that is below said fouling point of said filter media, and (ii) a preselected maximum flow rate set point;
an actuated flow control valve in fluid communication with said second outflow of filtered medium and in electronic communication with said controller, said actuated flow control valve solely and variably adjustable by said controller based upon at least one of said pressure differential and said flow rate;
a pressure differential sensor configured to detect a pressure differential between a first location proximate and prior to said filter media and a second location proximate and subsequent to said filter media, each with respect to said fluid flow pathway, said pressure differential sensor in electronic communication with said controller and, collectively with said controller, configured to: (i) compare a measured pressure differential to said preselected pressure differential set point, and (ii) reduce the flow of said fluid medium through said second outflow of said filtered medium to avoid exceeding said preselected pressure differential set point by adjusting said actuated flow control valve; and
a flow meter in fluid communication with said second outflow, said flow meter configured to detect a measured flow rate of said filtered medium within said second outflow of said filtered medium, said flow meter further in electronic communication with said controller and, collectively with said controller, configured to: (i) compare said measured flow rate of said filtered medium within said second outflow to said preselected maximum flow rate set point, and (ii) reduce the flow of said fluid medium through said second outflow of said filtered medium to avoid exceeding said preselected maximum flow rate set point by adjusting said actuated flow control valve.

2. The filtration system as set forth in claim 1, further comprising an outlet valve in fluid communication with said first outflow of fluid medium, and wherein said actuated flow control valve is configured to close and said outlet valve is configured to selectively open to purge said particulates from said cross-flow filter when one of the following conditions are met:
   (i) both said preselected pressure differential set point and said preselected maximum flow rate set point are reached;
   (ii) a preselected safety shut off pressure differential set point is reached;
   (iii) said preselected safety shut off pressure differential set point is maintained for a preselected period of time; and
   (iv) said flow rate decreases to a preselected minimum flow rate set point.

3. The filtration system as set forth in claim 2, wherein said preselected safety shut off pressure differential set point is higher than said preselected pressure differential set point.

4. The filtration system as set forth in claim 2, wherein said preselected minimum flow rate set point is lower than said preselected maximum flow rate set point.

5. The filtration system as set forth in claim 1, further comprising:
   a circulation loop having a circulation pump, said circulation loop in fluid communication with said medium source and said cross-flow filter, said circulation loop receiving said fluid medium and circulating said fluid medium to and from said cross-flow filter, and
   said fluid medium introduced into said circulation loop from said medium source at a location between said circulation pump and said first outflow of said fluid medium from said cross-flow filter.

6. The filtration system as set forth in claim 5, further comprising an influent pump in fluid communication with said medium source and said circulation loop, said influent pump providing said fluid medium from said medium source into said circulation loop.

7. The filtration system as set forth in claim 1, wherein said cross-flow filter is a hydroclone filter.

8. The filtration system as set forth in claim 1, wherein said actuated flow control valve is automatically adjustable by said controller based upon at least one of said pressure differential and said flow rate.

9. A method of fluid filtration, comprising:
   providing fluid medium for filtration having particulates suspended in said fluid in a fluid flow pathway through a cross-flow filter;
   filtering particulates from said fluid medium across a filter media of said cross-flow filter;
   directing filtered medium absent said particulates from said cross-flow filter through a flow meter and an actuated flow control valve;
   measuring pressure at a first location proximate and prior to said filter media and at a second location proximate and subsequent to said filter media, each with respect to said fluid flow pathway;
   detecting a pressure differential across said cross-flow filter as the difference of said pressure at said first and second locations;
   comparing said pressure differential to a preselected pressure differential set point that is below a fouling point of said filter media;
   measuring a flow rate of said filtered medium at said flow meter;
   comparing said measured flow rate to a preselected maximum flow rate set point;
   controlling said pressure differential and said flow rate by selectively adjusting solely said actuated flow control valve to avoid exceeding at least one of: (i) said preselected pressure differential set point and (ii) said preselected maximum flow rate set point;
   increasing flow through said actuated flow control valve to increase at least one of said pressure differential and said flow rate; and
   decreasing flow through said actuated flow control valve to decrease at least one of said pressure differential and said flow rate.

10. The method as set forth in claim 9, further comprising purging said cross-flow filter of accumulated particulates when one of the following conditions are met:
   (i) both said preselected pressure differential set point and said preselected maximum flow rate set point are reached;
   (ii) a preselected safety shut off pressure differential is reached;
   (iii) said preselected safety shut off pressure differential is maintained for a preselected period of time; and
   (iv) said flow rate decreases to a preselected minimum flow rate set point.

11. The method as set forth in claim 10, wherein said preselected safety shut off pressure differential set point is higher than said preselected pressure differential set point.

12. The method as set forth in claim 10, wherein said preselected minimum flow rate set point is lower than said preselected maximum flow rate set point.

13. The method as set forth in claim 9, wherein said fluid medium for filtration is directed through said cross-flow filter from a circulation loop and said method further comprises reintroducing a portion of said fluid medium back into said circulation loop from said cross-flow filter.

* * * * *

UNITED STATES PATENT AND TRADEMARK OFFICE
CERTIFICATE OF CORRECTION

| | | |
|---|---|---|
| PATENT NO. | : 10,610,873 B2 | Page 1 of 1 |
| APPLICATION NO. | : 14/808891 | |
| DATED | : April 7, 2020 | |
| INVENTOR(S) | : Jason D Lalli | |

It is certified that error appears in the above-identified patent and that said Letters Patent is hereby corrected as shown below:

On the Title Page

Item (57), Abstract, Line 2, delete "are" and insert -- is --.

In the Specification

In Column 1, Line 41, delete "dogged" and insert -- clogged --.

In Column 2, Line 66, delete "450" and insert -- 150 --.

In Column 2, Line 67, delete "462" and insert -- 162 --.

In Column 9, Line 54, delete "085" and insert -- 0.85 --.

Signed and Sealed this
Tenth Day of December, 2024

Katherine Kelly Vidal
*Director of the United States Patent and Trademark Office*